(12) United States Patent
Hartshorn et al.

(10) Patent No.: US 10,882,629 B2
(45) Date of Patent: Jan. 5, 2021

(54) ROLL LOAD BEARING AIRCRAFT PROPULSOR MOVEABLE PANEL SYSTEMS AND METHODS

(71) Applicant: The Boeing Company, Chicago, IL (US)

(72) Inventors: Scott D. Hartshorn, Snohomish, WA (US); Christopher E. Hullman, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 338 days.

(21) Appl. No.: 16/057,339

(22) Filed: Aug. 7, 2018

(65) Prior Publication Data

US 2020/0047899 A1    Feb. 13, 2020

(51) Int. Cl.
| | |
|---|---|
| *B64D 29/06* | (2006.01) |
| *B64D 29/02* | (2006.01) |
| *B64D 29/04* | (2006.01) |
| *F02K 1/54* | (2006.01) |
| *B64F 5/10* | (2017.01) |
| *F02C 3/04* | (2006.01) |

(52) U.S. Cl.
CPC ............. *B64D 29/06* (2013.01); *B64D 29/02* (2013.01); *B64D 29/04* (2013.01); *B64F 5/10* (2017.01); *F02K 1/54* (2013.01); *F02C 3/04* (2013.01); *F05D 2220/323* (2013.01)

(58) Field of Classification Search
CPC ........ B64D 29/06; B64D 29/02; B64D 29/04; F05D 2220/323

USPC ........................................................ 244/54
See application file for complete search history.

(56) References Cited

U.S. PATENT DOCUMENTS

| | | | | |
|---|---|---|---|---|
| 2,936,999 A | * | 5/1960 | Jacobus | F01D 25/162 |
| | | | | 415/134 |
| 3,352,114 A | * | 11/1967 | Ward | F02C 7/20 |
| | | | | 60/262 |
| 3,844,115 A | * | 10/1974 | Freid | B64D 27/26 |
| | | | | 60/797 |
| 4,471,609 A | * | 9/1984 | Porter | F02C 7/20 |
| | | | | 60/797 |
| 4,658,579 A | * | 4/1987 | Bower | B64C 7/02 |
| | | | | 60/226.1 |
| 5,737,914 A | * | 4/1998 | Porte | B64D 29/00 |
| | | | | 244/129.4 |
| 7,762,086 B2 | * | 7/2010 | Schwark | F01D 25/285 |
| | | | | 60/796 |
| 8,672,260 B2 | * | 3/2014 | Penda | B64D 27/20 |
| | | | | 244/54 |
| 9,410,441 B2 | * | 8/2016 | MacFarlane | F02C 3/10 |
| 10,272,997 B1 | * | 4/2019 | Karem | B64C 29/02 |
| 10,589,868 B2 | * | 3/2020 | Joel | B64D 29/08 |
| 10,723,471 B2 | * | 7/2020 | Stuart | B64D 29/02 |
| 2017/0066518 A1 | * | 3/2017 | Gallant | B64C 1/068 |

(Continued)

*Primary Examiner* — Christopher P Ellis
(74) *Attorney, Agent, or Firm* — Haynes and Boone, LLP (57) ABSTRACT

An aircraft propulsor that includes a load bearing moveable panel is described herein. In one example, the moveable panel can be coupled to a propulsor structure to receive loads from the propulsor structure. Such loads can include roll and/or torque loads generated by rotation of a core engine of the aircraft propulsor. The moveable panel can be coupled to the propulsor structure through a plurality of coupling portions on one or both of the moveable panel and the propulsor structure.

20 Claims, 11 Drawing Sheets

(56) References Cited

U.S. PATENT DOCUMENTS

| | | | | |
|---|---|---|---|---|
| 2018/0030926 A1* | 2/2018 | Eckett | ............... | B64D 33/04 |
| 2018/0187773 A1* | 7/2018 | Hallman | ............... | F02C 7/36 |
| 2019/0300190 A1* | 10/2019 | Stretton | ............ | F01D 25/243 |
| 2020/0269987 A1* | 8/2020 | Gleize | ............... | B64D 27/26 |

* cited by examiner

ROLL LOAD BEARING AIRCRAFT PROPULSOR MOVEABLE PANEL SYSTEMS AND METHODS

TECHNICAL FIELD

The disclosure relates generally to aircrafts and more specifically to aircraft propulsors.

BACKGROUND

Operation of aircraft propulsors produces wind up torque and/or roll load from rotation of various components of the propulsors. Such loads may cause substantial deformation of the aircraft propulsor, which can affect systems and performance of the aircraft propulsor. Traditionally, aircraft propulsor structures are configured to receive such loads, but typically reinforcement of such structures is required and can result in significantly bulkier and heavier aircraft propulsors.

SUMMARY

Systems and methods are disclosed for an aircraft propulsor that includes a load bearing moveable panel to receive roll and/or torque loads. In a certain example, the aircraft propulsor can include a propulsor structure, a core engine, a fixed nacelle, and a moveable panel. The propulsor structure can be configured to be fixably coupled to an aircraft engine mount and include a plurality of propulsor structure coupling portions. The core engine can be coupled to the propulsor structure. The fixed nacelle can be coupled to the propulsor structure and can at least partially circumscribing the core engine. The moveable panel can be configured to be disposed on an outer portion of the aircraft propulsor. The moveable panel can include a panel first end, a panel second end, and a plurality of moveable panel coupling portions. Each moveable panel coupling portion can be configured to couple to a corresponding propulsor structure coupling portion to receive roll load from the core engine. The panel first end is hinged to a first portion of the propulsor structure and/or the fixed nacelle and the panel second end is configured to be latched and unlatched to a second portion of the propulsor structure and/or the fixed nacelle.

In another example, a method of manufacturing can be provided. The method can include providing an aircraft propulsor including a propulsor structure that includes a plurality of propulsor structure coupling portions and a fixed nacelle coupled to the propulsor structure. The method can further include coupling a moveable panel that includes a panel first end, a panel second end, and a plurality of moveable panel coupling portions corresponding to the propulsor structure coupling portions on an outer portion of the aircraft propulsor by hinging the panel first end to a first portion of the propulsor structure and/or the fixed nacelle. In such an example, the panel second end is configured to be latched and unlatched to a second portion of the propulsor structure and/or the fixed nacelle and each moveable panel coupling portion is configured to couple to a corresponding propulsor structure coupling portions to receive roll load.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various examples of aircraft propulsors with load bearing moveable panels are described herein. Such aircraft propulsors can include a propulsor structure, a core engine coupled to the propulsor structure, a fixed nacelle, and a moveable panel. The moveable panel includes coupling portions that are configured to couple to the fixed nacelle to transfer load between the moveable panel and the fixed nacelle.

Figure 1:
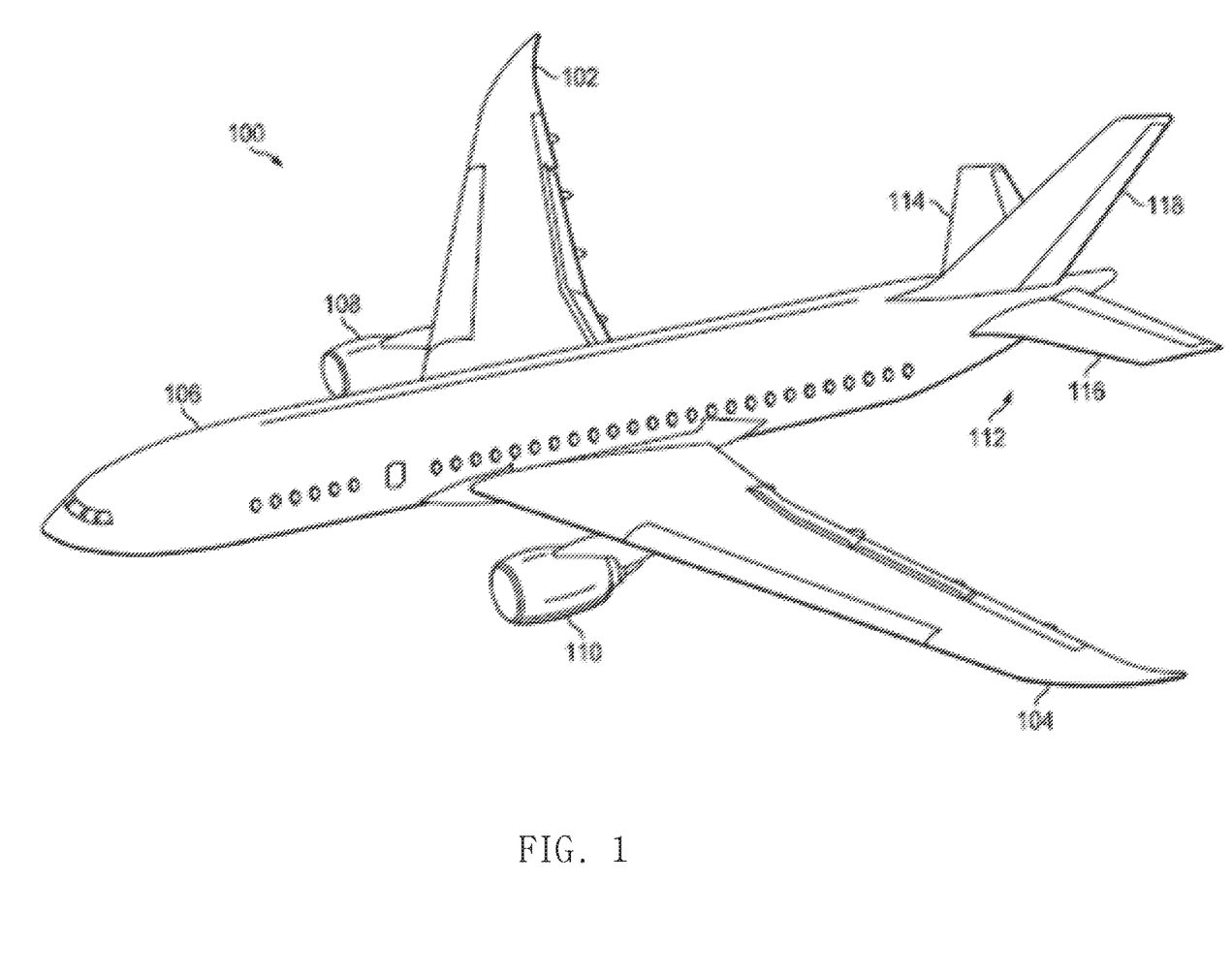
FIG. 1 illustrates an aircraft in accordance with an example of the disclosure.

FIG. 1 illustrates an aircraft in accordance with an example of the disclosure. Aircraft 100 includes wing 102 and wing 104 attached to fuselage 106. Aircraft 100 includes aircraft propulsor 108 attached to wing 102 and engine 110 attached to wing 104. Aircraft 100 also includes tail section 112. Horizontal stabilizer 114, horizontal stabilizer 116, and vertical stabilizer 118 are attached to tail section 112. Aircraft propulsor 108 can be an aircraft propulsor with load bearing movable panels in accordance with the illustrative embodiments described herein.

While aircraft 100 is a fixed wing aircraft, in other illustrative examples, aircraft 100 can be some other type of aircraft such as a helicopter or other vertical or short vertical take-off and landing vehicles, a spacecraft, a drone, and/or another type of vehicle.

Figure 2:
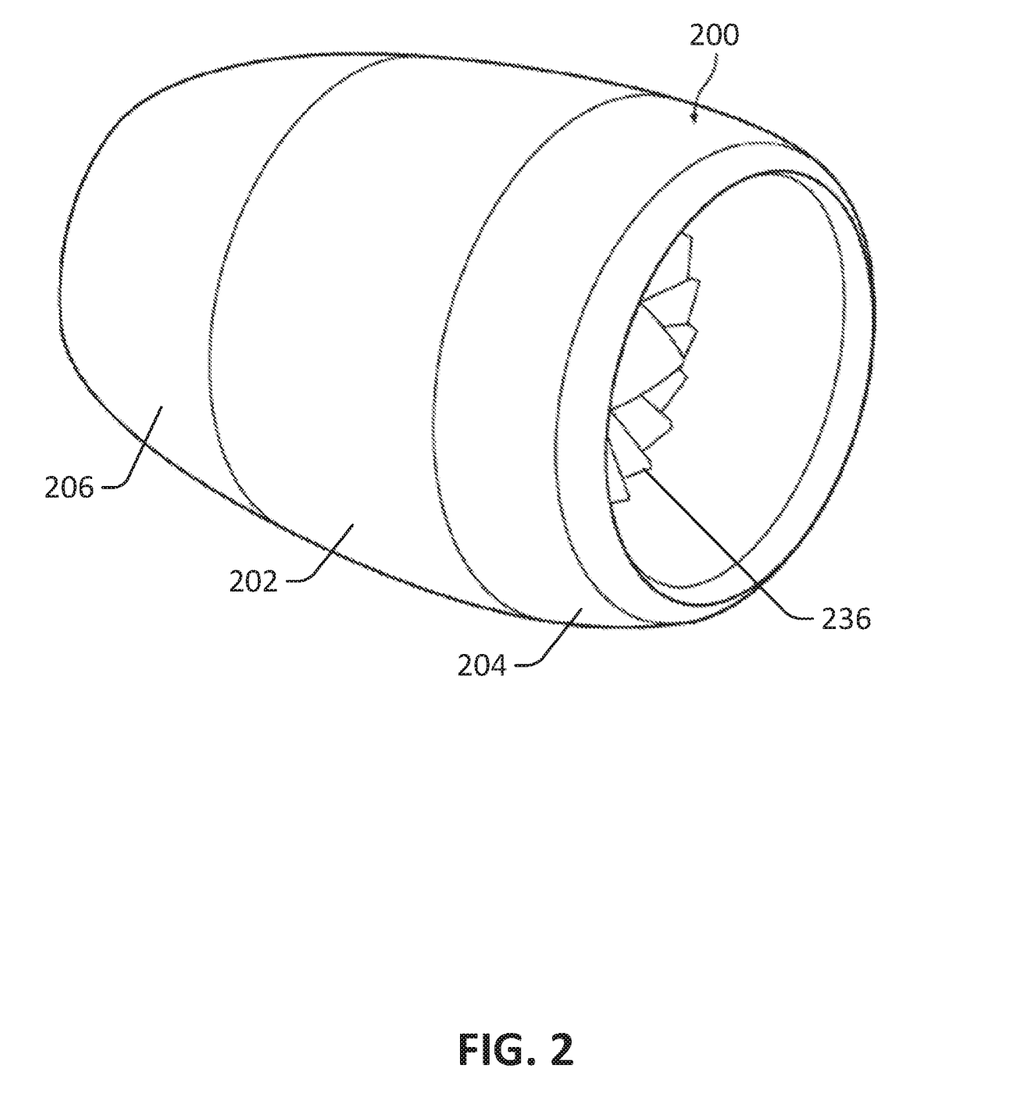
FIG. 2 illustrates an aircraft propulsor in accordance with an example of the disclosure.

FIG. 2 illustrates an aircraft propulsor in accordance with an example of the disclosure. FIG. 2 illustrates aircraft propulsor 200 that includes moveable panel 202, fixed nacelles 204 and 206, and core engine 236. Aircraft propulsor 200 can include a propulsor structure that includes fixed nacelles 204 and 206 and/or moveable panel 202.

The propulsor structure can be configured to be fixably coupled to an aircraft engine mount via one or more mounting points. Additionally, the propulsor structure is load bearing and can receive loads such as roll and/or torque loads from the operation of core engine 236. Furthermore, the propulsor structure can include one or more propulsor structure coupling portions configured to couple to and receive load from and/or provide loads to moveable panel 202. Accordingly, the propulsor structure coupling portions can, for example, distribute load received by the propulsor structure to moveable panel 202.

Such a configuration can allow the moveable panel 202 to bear a portion of the load received by the propulsor structure. Engine mounts of aircraft propulsors generally have relatively narrow footprints. Such narrow footprints can result in significant displacements within the structure of aircraft propulsor 200 from wind up torque. Allowing for moveable panel 202 to bear a portion of the load from the wind up torque can result in lower displacement of aircraft propulsor 200 and/or allow for lighter and/or more compact propulsor structures or engine mounts. Accordingly, aircraft performance or efficiency can be increased.

The propulsor structure coupling portions are described in further detail herein. In certain examples, the shape of moveable panel 202 can allow for moveable panel 202 to be especially suitable for bearing loads generated by rotation of core engine 236 and/or other components of aircraft propulsor 200. For example, the semi-circular shape of moveable panel 202 can be Core engine 236 can provide thrust. Core engine 236 can be a turbofan, turbojet, turboprop, ramjet, and/or other type of engine that produces thrust to power an aircraft. Core engine 236 can include combustion components (e.g., combustion chambers), rotational components (e.g., one or more compressors), and/or other components that can produce thrust. Operation of core engine 236 can generate loads that can be received by the propulsor structure and/or moveable panel 202.

Figure 3:
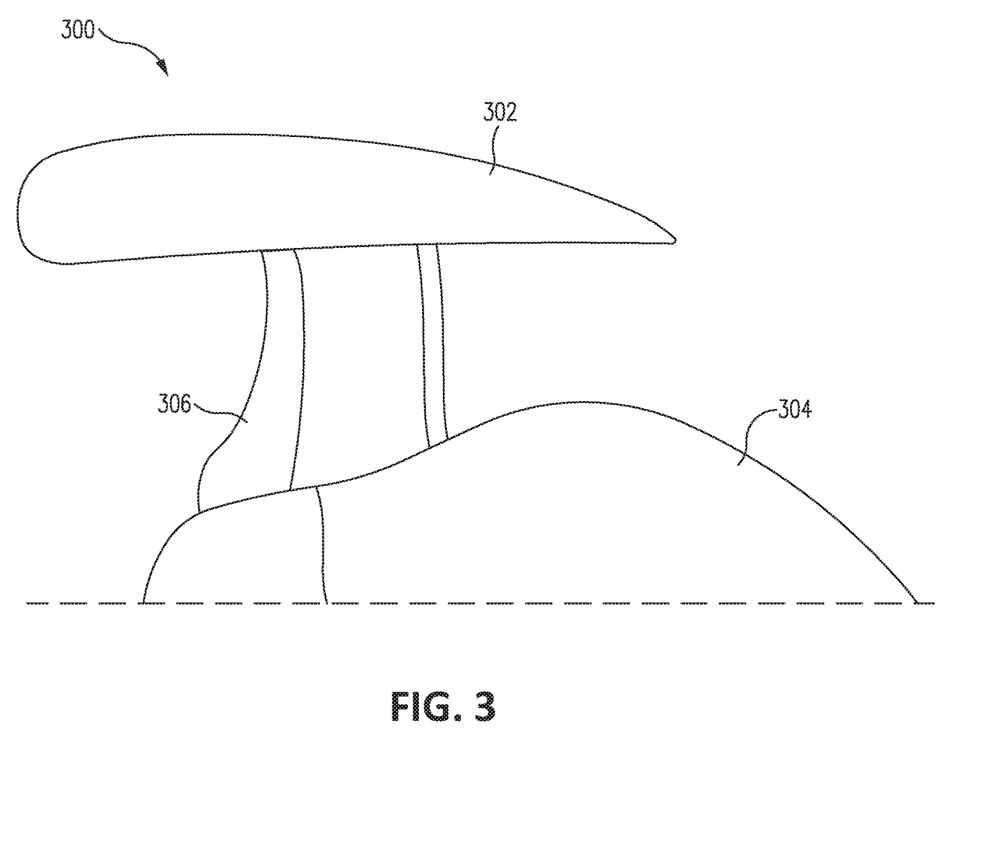
FIG. 3 illustrates a side cutaway of an aircraft propulsor with load bearing moveable panels in accordance with an example of the disclosure.

FIG. 3 illustrates a side cutaway of an aircraft propulsor with load bearing moveable panels in accordance with an example of the disclosure. FIG. 3 illustrates aircraft propulsor 300 with outer nacelle 302, inner nacelle 304, and core engine 306.

One or both of outer nacelle 302 and inner nacelle 304 can include a propulsor structure, a fixed nacelle, and a load bearing moveable panel. Such a moveable panel can couple to the propulsor structure and/or the fixed nacelle via one or more propulsor structure coupling portions.

Figure 4A:
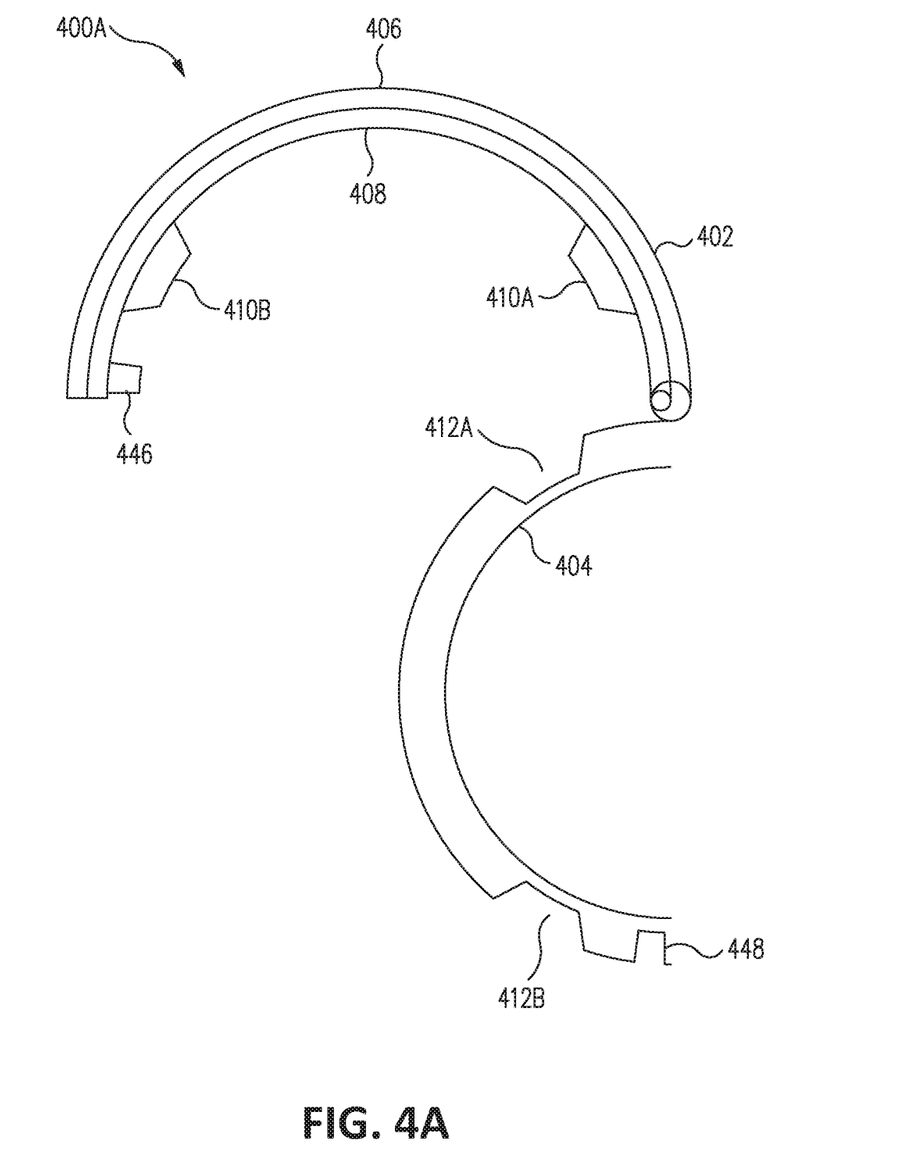
FIGS. 4A-B illustrate front views of an aircraft propulsor with load bearing moveable panels in accordance with examples of the disclosure.
Figure 4B:
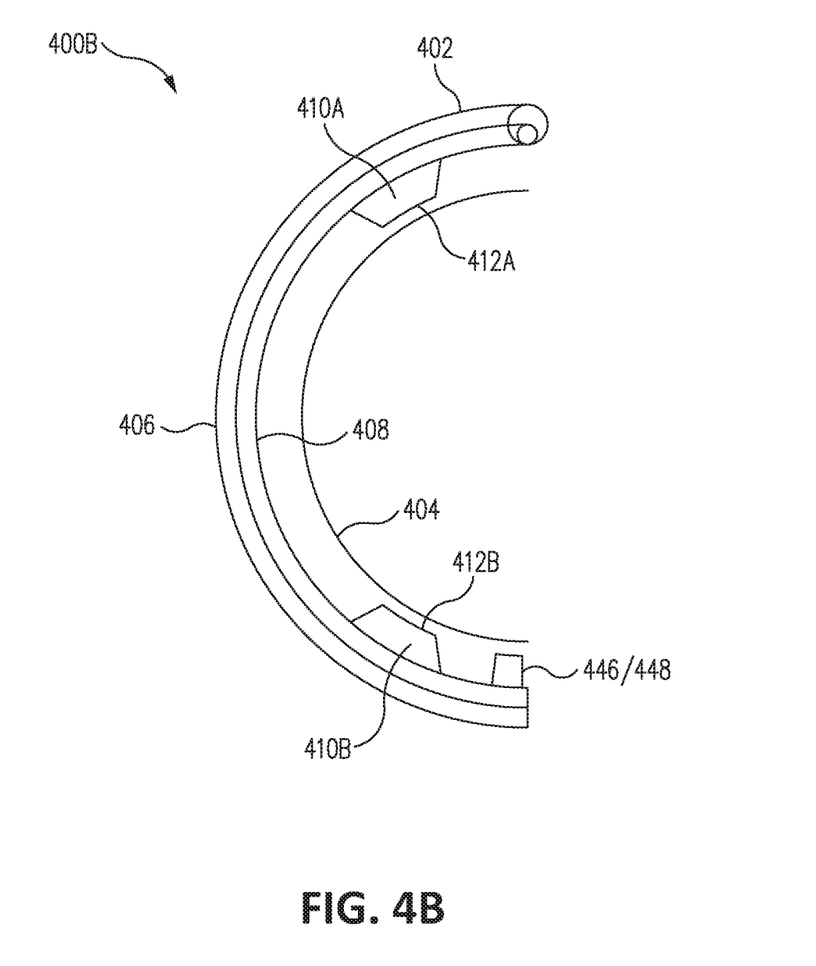

FIGS. 4A-B illustrate front views of an aircraft propulsor with load bearing moveable panels in accordance with examples of the disclosure. FIGS. 4A and 4B illustrate aircraft propulsors 400A and 400B, respectively, that each include moveable panel 402 and propulsor structure 404.

Moveable panel 402 includes outer wall 406 and inner wall 408. In certain examples, outer wall 406 and inner wall 408 can be constructed from the same or different materials. In examples where outer wall 406 and inner wall 408 are constructed as separate components and coupled together, one or both of outer wall 406 and inner wall 408 can be load bearing. For example, inner wall 408 can be load bearing and can be at least partially constructed of titanium. In certain such examples, outer wall 406 can be load bearing, or can be configured to not bear significant load. Thus, in the above example, outer wall 406 can be at least partially constructed of carbon fiber and can be configured to not bear significant load. In such an example, load can then accordingly be routed through the titanium inner wall 408, which can be more appropriate for bearing load.

Moveable panel 402 can also include one or more moveable panel coupling portions, such as moveable panel coupling portions 410A and 410B. Moveable panel coupling portions 410A and 410B can be configured to engage corresponding propulsor structure coupling portions 412A and 412B. When moveable panel coupling portions 410A and 410B are engaged with propulsor structure coupling portions 412A and 412B, load can be transferred between moveable panel 402 and propulsor structure 404. Load may be transferred by, for example, interlocking at least one of the moveable panel coupling portions 410A and 410B with at least one of corresponding propulsor structure coupling portions 412A and 412B.

As shown in FIGS. 4A and 4B, moveable panel coupling portions 410A and 410B are located on opposite ends of moveable panel 402 and are protrusions. Additionally, one end of moveable panel 402 can be coupled (e.g., hinged) to propulsor structure 404 to allow controlled movement of moveable panel 402 relative to propulsor structure 404. While the example shown in FIGS. 4A and 4B illustrate a moveable panel 402 configured to rotate relative to propulsor structure 404, other examples can allow for movement of the moveable panel relative to the propulsor structure in other ways.

Moveable panel coupling portions 410A and 410B can be protrusions while propulsor structure coupling portions 412A and 412B are grooves configured to receive the protrusions of moveable panel coupling portions 410A and 410B. Propulsor structure coupling portions 412A and 412B are located on corresponding ends of propulsor structure 404 so that, when moveable panel 402 is closed (e.g., latched to propulsor structure 404), the protrusions of moveable panel coupling portions 410A and 410B are engaged within the grooves of propulsor structure coupling portions 412A and 412B.

In certain examples, such engagement can include contact between at least a portion of the moveable panel coupling portions 410A and/or 410B and corresponding propulsor structure coupling portions 412A and/or 412B to allow for load transfer. Other examples might not include contact between the portions. However, deflection of the moveable panel 402 and/or propulsor structure 404 can allow the portions to come in contact when moveable panel 402 and/or propulsor structure 404 receives a load greater than a threshold load and, thus, allow the portions to transfer load between them.

Certain examples of the coupling portions can include moveable components such as latches, retractable pins, moveable hooks, and/or other such components. Other examples of the coupling portions can include only fixed components. For example, such examples can include only protrusions and/or depressions. Corresponding coupling portions can engage each other to mechanically interlock.

As shown in FIGS. 4A-B, moveable panel coupling portions 410A and 410B are formed with a trapezoidal shape and structure coupling portions 412A and 412B have corresponding features to receive the trapezoidal shape. Such a shape can allow for more positive engagement between moveable panel 402 and propulsor structure 404 and allow for more efficient transfer of roll and/or torque loads between moveable panel 402 and propulsor structure 404 (e.g., the planes of the contacting portions of the moveable panel coupling portions 410A and 410B with the structure coupling portions 412A and 412B can be arranged orthogonal to the direction of the loads transferred.)

FIG. 4A illustrates moveable panel 402 in an open position. Such an open position can allow access to components contained within the nacelle of aircraft propulsor 400A. FIG. 4B illustrates moveable panel 402 in a closed position. In the closed position, the protrusions of moveable panel coupling portions 410A and 410B are disposed within the grooves of structure coupling portions 412A and 412B to allow for load to transfer between moveable panel 402 and propulsor structure 404.

Furthermore, moveable panel 402 can be coupled to propulsor structure 404 via mechanical holding components 446 and 488 in addition to the coupling portions. Mechanical holding component 446 is disposed on moveable panel 402 and mechanical holding component 448 is disposed on propulsor structure 404. Mechanical holding component 446/448 can, for example, include one or more latches. Mechanical holding components 446/448 can be separate from the coupling portions. Mechanical holding components 446/448 can be configured to lock when engaged with each other and, thus, hold moveable panel 402 to propulsor structure 404 unless an input is received to unlock mechanical holding components 446/448.

Figure 5:
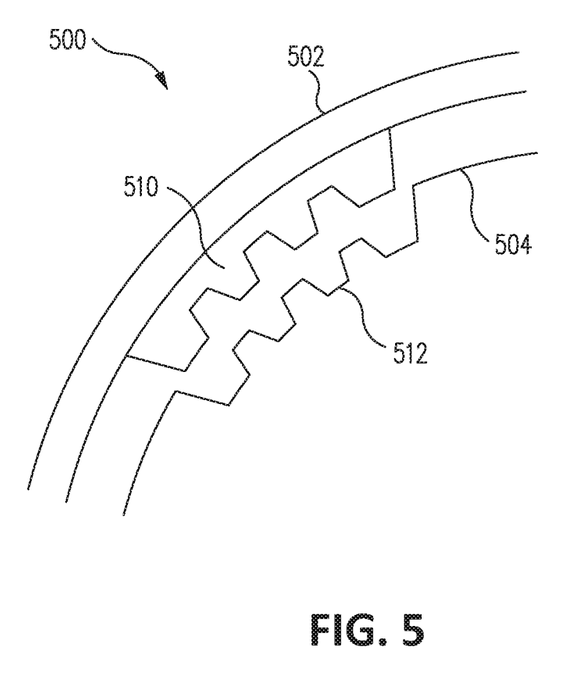
FIG. 5 illustrates a front view of moveable panel coupling portions in accordance with an example of the disclosure.

FIG. 5 illustrates a front view of moveable panel coupling portions in accordance with an example of the disclosure. FIG. 5 illustrates aircraft propulsor 500 with an alternative configuration of moveable panel coupling portion 510 and structure coupling portion 512. Moveable panel coupling portion 510 is coupled to moveable panel 502 and structure coupling portion 512 is coupled to propulsor structure 504.

As shown in FIG. 5, both moveable panel coupling portion 510 and structure coupling portion 512 include teeth. The teeth of moveable panel coupling portion 510 are configured to mesh with the teeth of structure coupling portion 512 when moveable panel 502 is in the closed position. The meshed teeth can allow for a more secure engagement between moveable panel coupling portion 510 and structure coupling portion 512 by allowing for more interlocking surfaces between the two coupling portions.

Figure 6:
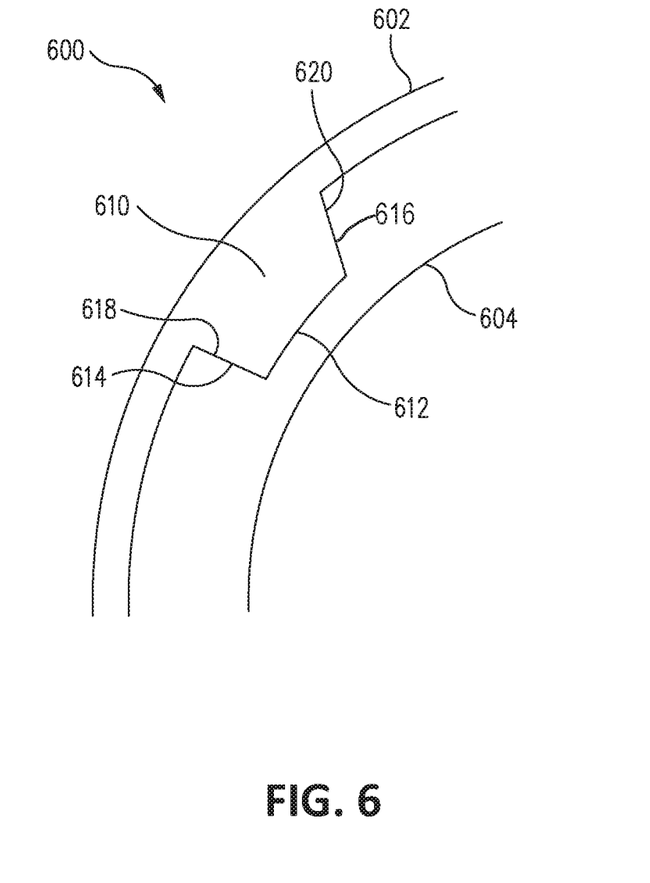
FIG. 6 illustrates a front view of another example of moveable panel coupling portions in accordance with an example of the disclosure.

FIG. 6 illustrates a front view of another example of moveable panel coupling portions in accordance with an example of the disclosure. FIG. 6 illustrates aircraft propulsor 600 with an alternative configuration of moveable panel coupling portion 610 of moveable panel 602 and structure coupling portion 612 of propulsor structure 604.

As shown in FIG. 6, moveable panel coupling portion 610 can include panel first side 614 and panel second side 616. Structure coupling portion 612 can include corresponding structure first side 618 and structure second side 620. Moveable panel coupling portion 610 is a protrusion in a non-isosceles trapezoidal shape and structure coupling portion 612 is correspondingly shaped to match moveable panel coupling portion 610.

For example, panel first side 614 and structure first side 618 may be disposed to be substantially orthogonal to a direction of the roll and/or torque load (e.g., resulting from operation of aircraft propulsor 600), to aid in transfer of load between moveable panel 602 and propulsor structure 604. In such an example, propulsor structure 604 and/or moveable panel 602 can receive a majority of roll and/or torque loads in the clockwise direction. In other examples where a majority of roll and/or torque loads are experienced in the counterclockwise direction, the orientation of the protrusion and depression of moveable panel 602 and propulsor structure 604 can be reversed.

Panel second side 616 and structure second side 620 can be arranged at an angle to the direction of the roll and/or torque load to ease the opening and closing of moveable panel 602. As the majority of the roll and/or torque load is applied in a clockwise direction, arranging panel second side 616 and structure second side 620 at an angle would only minimally affect load transfer.

Figure 7:
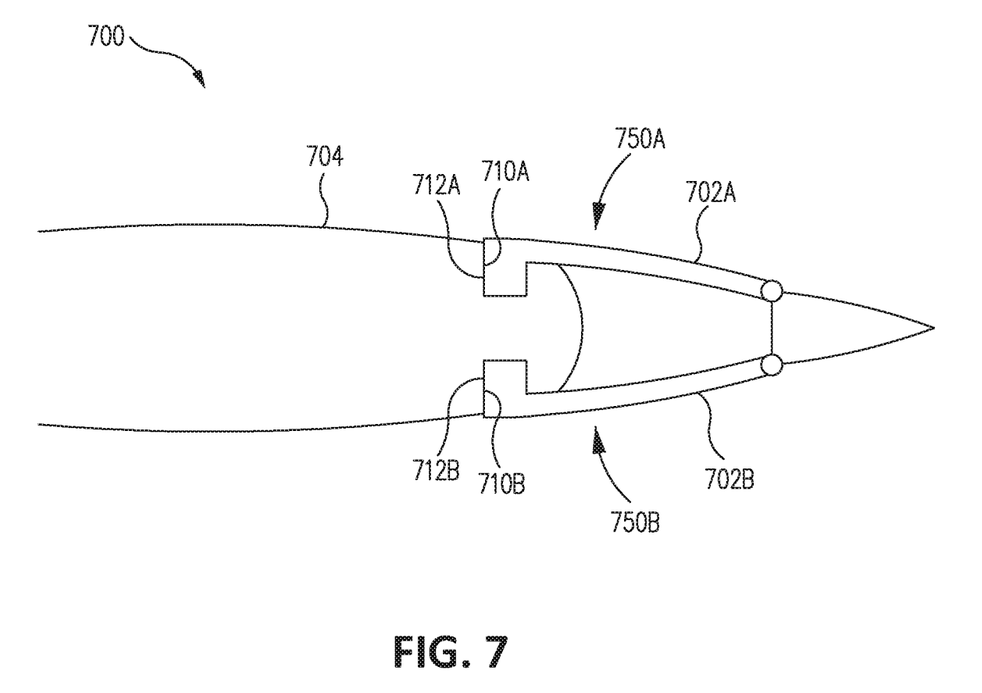
FIG. 7 illustrates a side cutaway view of a further load bearing moveable panel configuration in accordance with an example of the disclosure.

FIG. 7 illustrates a side cutaway view of a further load bearing moveable panel configuration in accordance with an example of the disclosure. While certain examples of load bearing moveable panels may include access panels, FIG. 7 illustrates an example of a load bearing moveable thrust reverser panel. FIG. 7 illustrates aircraft propulsor 700 that includes moveable panels 702A and 702B and propulsor structure 704.

Moveable panels 702A and 702B can be thrust reverser doors that allow for thrust reversing airflow to exit from one or more thrust reversing flow paths of aircraft propulsor 700 when moveable panels 702A and 702B are open. Moveable panels 702A and 702B can move in directions 750A and 750B, respectively, to move from an open position to a closed position. Moveable panels 702A and 702B can rotate along directions 750A and 750B.

When in the closed position, moveable panel coupling portions 710A and 710B of moveable panels 702A and 702B are engaged with structure coupling portions 712A and 712B of propulsor structure 704 to allow for loads to transfer between moveable panels 702A and 702B and propulsor structure 704.

Figure 8A:
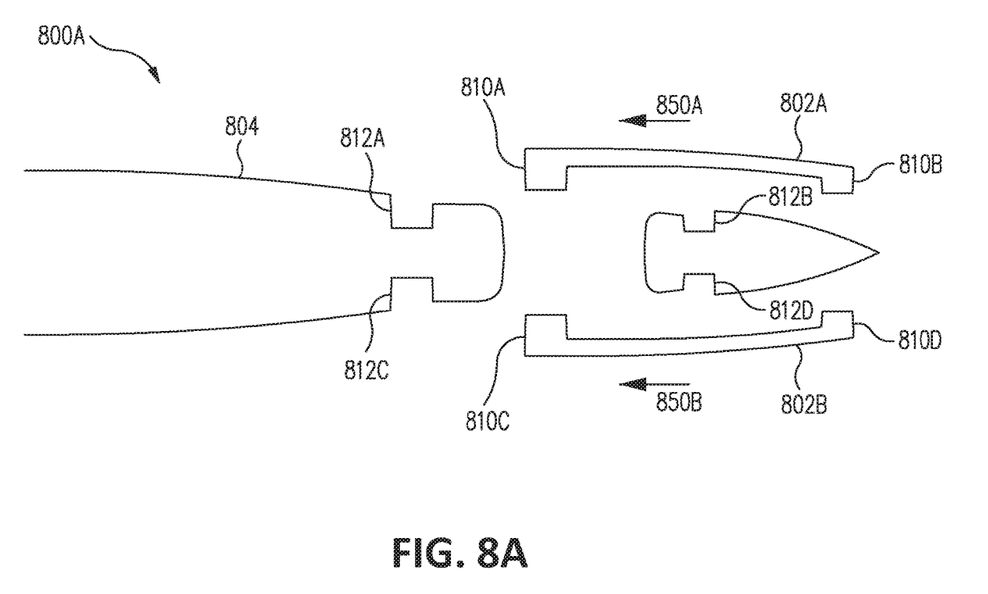
FIGS. 8A-B illustrate side cutaway views of another load bearing moveable panel configuration in accordance with an example of the disclosure.
Figure 8B:
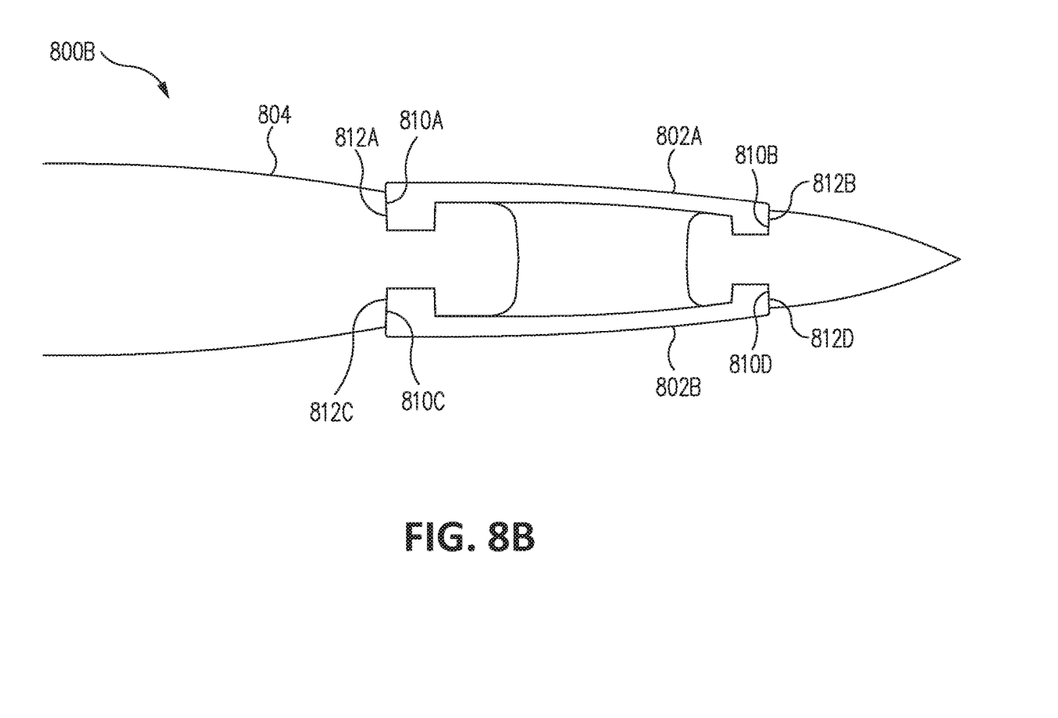

FIGS. 8A-B illustrate side cutaway views of another load bearing moveable panel configuration in accordance with an example of the disclosure. FIGS. 8A and 8B illustrate aircraft propulsor 800 that includes moveable panels 802A and 802B and propulsor structure 804. Moveable panels 802A and 802B can be thrust reverser doors that at least partially translate between open and closed positions. For example, moveable panels 802A and 802B can translate from the closed position to the open position along directions 850A and 850B, respectively.

When in the closed position, moveable panel coupling portions 810A-D are engaged with structure coupling portions 712A-B to allow for loads to transfer between moveable panels 802A and 802B and propulsor structure 804.

Figure 9:
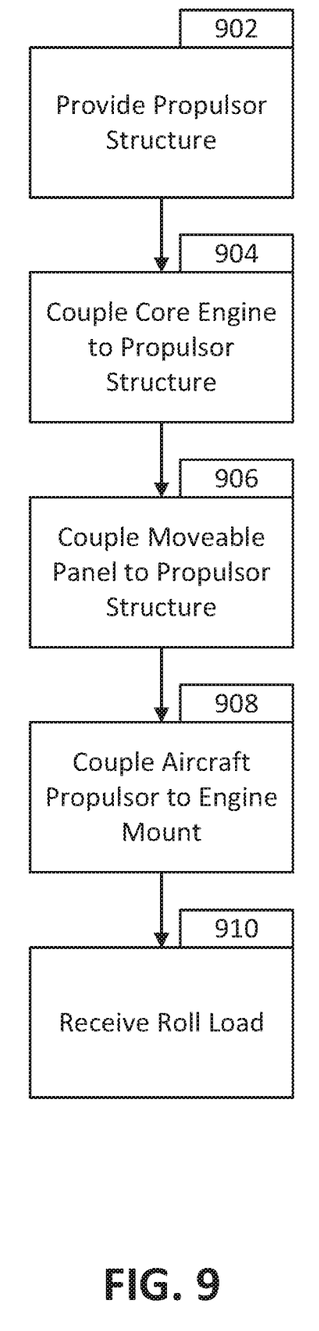
FIG. 9 is a flowchart detailing a method of assembling an aircraft propulsor in accordance with an example of the disclosure.

FIG. 9 is a flowchart detailing a method of assembling an aircraft propulsor in accordance with an example of the disclosure. In block 902, a propulsor structure is provided. The propulsor structure may be a structure as described herein and the propulsor structure can include a plurality of propulsor structure coupling portions and a fixed nacelle coupled to the propulsor structure.

In block 904, a core engine can be coupled to the propulsor structure. The core engine can be configured to provide thrust for an aircraft. The core engine can be coupled to various portions of the propulsor structure and can be at least partially contained within the propulsor structure.

In block 906, a moveable panel can be coupled to the propulsor structure. The moveable panel can be coupled to the propulsor structure in a manner that would allow the moveable panel to move relative to the propulsor structure (e.g., through rotation, translation, or both). In certain examples, the moveable panel can include a panel first end and a panel second end. A portion of the moveable panel, such as a portion of the panel first end, can be coupled to the propulsor structure (e.g., hinged) to allow the moveable panel to move relative to the propulsor structure. Another portion of the moveable panel, such as a portion of the panel second end, can be configured to be latched to the propulsor structure to hold the moveable panel in a closed position.

In block 908, the aircraft propulsor can be coupled to an engine mount of an aircraft. The aircraft propulsor can include one or more propulsor mounts configured to couple to the engine mount. The aircraft propulsor can be coupled to fuel lines, communication lines, and other components and thus be operational.

In block 910, the aircraft propulsor can be operated. For example, the core engine can produce power or thrust. The core engine can rotate during operation and operation of the core engine can produce loads or stresses. Additionally, the aircraft can also experience loads or stresses due to, for example, g-forces experienced by the aircraft structure. Such loads or stresses can be at least partially borne by the propulsor structure. The propulsor structure can transfer at least a portion of the loads or stresses borne to the moveable panel via the coupling portions.

Examples described above illustrate but do not limit the invention. It should also be understood that numerous modifications and variations are possible in accordance with the principles of the present invention. Accordingly, the scope of the invention is defined only by the following claims.

What is claimed is:

1. An aircraft propulsor comprising:
    a propulsor structure configured to be fixably coupled to an aircraft engine mount and comprising a plurality of propulsor structure coupling portions;
    a core engine coupled to the propulsor structure;
    a fixed nacelle coupled to the propulsor structure and at least partially circumscribing the core engine; and
    a moveable panel configured to be disposed on an outer portion of the aircraft propulsor, the moveable panel comprising a panel first end, a panel second end, and a plurality of moveable panel coupling portions, each moveable panel coupling portion configured to couple to a corresponding propulsor structure coupling portion to receive roll load from the core engine, wherein the panel first end is hinged to a first portion of the propulsor structure and/or the fixed nacelle and the panel second end is configured to be latched and unlatched to a second portion of the propulsor structure and/or the fixed nacelle.

2. The aircraft propulsor of claim 1, wherein the plurality of propulsor structure coupling portions comprise a plurality of grooves, and wherein the plurality of moveable panel coupling portions comprise a plurality of protrusions configured to be disposed within the plurality of grooves.

3. The aircraft propulsor of claim 1, wherein the core engine comprises a rotational component and the roll load comprises angular load resulting from rotation of the rotational component.

4. The aircraft propulsor of claim 1, wherein each of the moveable panel coupling portions are configured to receive the roll load from the core engine by interlocking at least one of the moveable panel coupling portions with a corresponding propulsor structure coupling portion.

5. The aircraft propulsor of claim 4, wherein the moveable panel coupling portion comprises first teeth and wherein the corresponding propulsor structure coupling portion comprises second teeth configured to interface with the first teeth.

6. The aircraft propulsor of claim 4, wherein one of the moveable panel coupling portion or the propulsor structure coupling portion comprises a depression and the other of the moveable panel coupling portion or the propulsor structure coupling portion comprises a protrusion configured to contact at least a portion of the depression when receiving roll load from the core engine.

7. The aircraft propulsor of claim 1, wherein the moveable panel comprises at least a portion of a thrust reverser.

8. The aircraft propulsor of claim 1, wherein the moveable panel coupling portion and the propulsor structure coupling portion consist of fixed components.

9. The aircraft propulsor of claim 1, wherein the moveable panel comprises an inner wall and an outer wall.

10. The aircraft propulsor of claim 9, wherein the inner wall comprises titanium.

11. The aircraft propulsor of claim 1, wherein the moveable panel and the propulsor structure are portions of an inner nacelle of the aircraft propulsor separate from the fixed nacelle.

12. The aircraft propulsor of claim 1, wherein the moveable panel and the propulsor structure are portions of an outer nacelle of the aircraft propulsor separate from the fixed nacelle.

13. An aircraft comprising the aircraft propulsor of claim 1, the aircraft further comprising:
    a fuselage; and
    a wing, wherein the aircraft engine mount is coupled to the fuselage or the wing.

14. A method of using the aircraft propulsor of claim 1, the method comprising:
    receiving the roll load with the propulsor structure; and
    transferring at least a portion of the roll load from the propulsor structure to the moveable panel via the plurality of moveable panel coupling portions.

15. A method of manufacturing comprising:
    providing an aircraft propulsor comprising a propulsor structure comprising a plurality of propulsor structure coupling portions and a fixed nacelle coupled to the propulsor structure; and
    coupling a moveable panel, comprising a panel first end, a panel second end, and a plurality of moveable panel coupling portions corresponding to the propulsor structure coupling portions on an outer portion of the aircraft propulsor by hinging the panel first end to a first portion of the propulsor structure and/or the fixed nacelle, wherein the panel second end is configured to be latched and unlatched to a second portion of the propulsor structure and/or the fixed nacelle, and wherein each moveable panel coupling portion configured to couple to a corresponding propulsor structure coupling portions to receive roll load.

16. The method of claim 15, further comprising coupling a core engine to the propulsor structure.

17. The method of claim 15, further comprising coupling the propulsor structure to an aircraft engine mount, wherein the aircraft engine mount is a portion of an aircraft.

18. The method of claim 15, wherein the roll load comprises angular load resulting from rotation of a rotational component of a core engine.

19. The method of claim 15, wherein the moveable panel coupling portion comprises first teeth and wherein the corresponding propulsor structure coupling portion comprises second teeth configured to interface with the first teeth.

20. The method of claim 15, wherein one of the moveable panel coupling portion or the propulsor structure coupling portion comprises a depression and the other of the moveable panel coupling portion or the propulsor structure coupling portion comprises a protrusion configured to contact at least a portion of the depression when receiving roll load from a core engine.

* * * * *